Patented Nov. 13, 1934

1,980,367

UNITED STATES PATENT OFFICE 1,980,367

MODIFICATION OF THE PHYSICAL PROPERTIES OF RESINS

László Auer, Budapest, Hungary, assignor to J. Randolph Newman, Washington, D. C., as trustee No Drawing. Application April 21, 1930, Serial No. 446,171. In Great Britain April 24, 1929

14 Claims. (Cl. 106—23)

The invention relates to the manufacture of modified products from resins, and it comprises methods of making such products wherein the resin, advantageous rosin or colophony, is mixed with certain modifying agents and the mixture is heated, advantageously to temperatures of 200° C. or above, until said products are obtained, the heating being advantageously effected under reduced pressure or vacuum; and it comprises the modified products thus obtained, such products being useful for many purposes, particularly in making coating compositions such as varnishes and the like; all as more fully hereinafter set forth and as claimed.

By my processes I obtain a modification of the physical properties (viscosity melting point etc.) of resins.

In my process natural resins are mixed with certain modifying agents and the mixture is heated until the modifying agent becomes distributed throughout the resin, that is dissolved or dispersed in the resin. This dissolving or dispersing of the modifying agent in the resin effects various modifications of the physical properties of the resin. The modifying agents are electrolytes or polar materials. These modifying agents have an effect upon the relation between the dispersed phase and the dispersion medium of isocolloid materials. Resins are isocolloid materials and by my process the said relations are altered and the physical properties modified. The modified products produced by my process are new and useful and may advantageously be used in many industrial arts, as in the manufacture of varnishes and the like. Also my new products may be subsequently converted into vulcanization products by suitable means, for instance vulcanization with sulphur and other vulcanizing agents.

As typical of those modifying agents, I may mention the following:

2-phenylamino-8-naphthol-6-sulphonic acid, beta-naphthylamine-3:6:8-trisulphonic acid, beta-naphthol-3:6:8-trisulphonic acid, beta-naphthol-1:5-disulphonic acid, naphthalene-2:6-disulphonic acid, naphthalene-1-sulphonyl chloride, m-xylidine sulphonic acid, benzene sulphonic acid, p-toluene sulphonic acid, p-toluene sulphonyl chloride, 5-sulpho salicylic acid, p-toluidine-m-sulphonic acid, benzene sulphonyl chloride, 2:5-dichlor benzene sulphonic acid.

I have found that organic sulphonic acids and their halides and esters are effective, to advantage, as modifying agents. The compounds listed ante are representative of that class of modifying agents. Methyl ester of p-toluene sulphonic acid and ethyl chlorsulphonate are typical of such esters of this class.

The given list of modifying agents is not a complete one and other agents giving the desired results may be used for said purposes.

The modifying agents should be added to the starting material in a dry form (without the presence of water) and in relatively small quantities. In order to ensure complete dissolution or dispersion of the modifying agent, the operation of dissolving or dispersing the latter should be carried out under application of heat. The degree of heat necessary depends upon the nature of the substance under treatment and also of the modifying agent used. Generally temperatures from 100 to 300° C. or more will give satisfactory results. The heat treatment promotes the complete (molecular or colloidal) dissolution of the modifying agent in the substance to be treated. In some cases it may be advisable to continue the heat treatment after the dissolution or dispersion of the modifying agent is substantially complete.

I have further found that the results of the process vary with the nature and/or with the physical condition (pressure) of the gas (air or other gas) present in the reaction chamber. When plus pressure was used (e. g. caused by the tension of the starting materials at higher temperatures), the results differ again from both of those of the treatments under atmospheric pressure and vacuum. Also, as to the nature of the gas present, air gives for instance a different result from another gas, or mixture of gases. The pressure conditions may also be alternated during the gas treatment which, of course may be carried out together with the dissolution or dispersion of the modifying agent in the substance to be treated or as an after-treatment.

It may be stated with reference to the action of gases that generally speaking rarifaction of the gases present in the reaction chamber by reduction of pressure tends to intensify their action in the process both in the case of solidification of the starting material and also in the case of liquefaction thereof.

The gas treatment may be carried out by blowing the gas through the reaction mixture or simply by passing it over the mass contained in the reaction chamber. The gas may be further produced in situ in the reaction mass by using substances which under the conditions of the reaction develop gases as desired. Such, for instance by using peroxides, carbonates, sulphides, sulphites and the like the corresponding gases may be developed in the reaction mass.

The process as described may be made to effect a solidification or a liquefaction of the resins. I have found that resins either soft or liquid or of any intermediate stage of viscosity may be obtained from solid resins. The results, namely, solidification on the one hand, or liquefaction in the other, depends in any given case upon conditions of the reaction, e. g. upon the duration of the heat-treatment of the material, the duration of the gas-treatment, the quantity of the dissolved modifying agent etc.

If desired, the modifying agent may be produced in situ within the mass of the substance under treatment by interaction within the substance, of substances capable of reacting under the conditions of the process to produce the modifying agent wanted.

The dissolution or dispersion of the modifying agents in the starting material may be favorably influenced by the addition of certain "auxiliary agents" or "sensitizers." These fall into two groups, namely the purely inorganic (e. g. silica gel, fuller's earth), and the purely organic (e. g. formaldehyde, phenol, thiocarbanilide, benzidine, hexamethylenetetramine, 2:3-hydroxynaphthoic acid, α-naphthol, quinoline, pyrogallol, benzene, glycerol and phthalimide). The specific examples of auxiliary or secondary agents here mentioned are to be taken as typical of the substances which have been successfully used for this purpose and not as comprising all the effective substances. It should be mentioned that quite a number of the modifying agents comprising within the molecule an acidic inorganic residue and an organic residue are auxiliary agents (sensitizers) when used in conjunction with other modifying agents. Suitable secondary agents are further amino-azobenzene sulphate, aniline sulphate, nitro cresyl carbonate, dimethyl sulphate, trichloroacetic acid, benzenesulphonic acid, iodoform, naphthalene tetrachloride, pinene hydrochloride, m-xylidine-sulphonic acid, β-naphthylamine-6:8-disulphonic acid, β-naphthylamine-6-sulphonic acid, acetyl chloride, p-nitro-acetanilide, chloral hydrate, and triphenyl phosphate, naphthalene-1-sulphochloride, diphenylamine hydrobromide, 5 (or 3)-amino salicylic acid, 2:6-naphthalene disulphonic acid, o-dichlorobenzene.

The advantage of a rapid dissolution of the modifying agent is greatest in those cases where a clear, pale or colorless product is desired, especially for example, for the varnish industry.

For the modification of the physical properties of the initial materials solutions or colloidal solutions of one or more electrolytes in an organic solvent may be used.

Solid coherent and elastic products may be obtained, similar in general characteristics to ordinary rubber, by adding sulphur to the initial substance in addition to the agents already mentioned. The sulphur may be added as such or in the form of a sulphur compound (e. g. sulphur chloride) which under the conditions of the process decomposes with liberation of nascent sulphur. It would appear that the action of the sulphur is analogous to that which takes place in the vulcanization of rubber. The sulphur or sulphur compounds may be added either at the beginning of the process or so as to act only during the gas treatment part of the process. Alternatively, the sulphur or sulphur compounds may be added to the material after the main reaction of the process has been completed. Alternating treatment with sulphur dioxide and hydrogen sulphide has been found to be specially useful in certain cases.

The vulcanizing treatment results from the formation of sulphur in situ.

In the vulcanization activators (e. g. zinc oxide), and accelerators, such as triphenylguanidine, mercaptobenzthiazole, tetraethylthiuram disulphide, may be advantageously used. If super-accelerators (e. g. piperidine pentamethylene, dithiocarbamate, diethylammonium diethyldithiocarbamate etc.) are added, vulcanization occurs below 100° C.

The modified materials produced by these processes may be used in a variety of industries, e. g. in the rubber, linoleum, varnish, soap and candle industries and others.

A very important application of the new products is the manufacture of new artificial materials by emulsification. One of the emulsification processes consists in subjecting the substance first to a treatment with modifying agents of the kind described and thereafter effecting further transformation by emulsification or dispersion in an aqueous medium. Or, the substance may be first emulsified or dispersed in an aqueous medium and thereafter treated with one or more of the above characterized agents which are capable to modify the physical properties of the starting material. The emulsions or dispersions may be vulcanized or sulphurized by one of the above described methods. The emulsions or dispersions obtained, whether vulcanized or not, are valuable in the art for a variety of purposes. They may be for example concentrated and used for impregnation of textiles; or the disperse phase may be separated in solid form by means of the usual coagulating agents, or by drying (as e. g. when the aqueous dispersions are used for varnishes), or it may be deposited on forms by dipping (in which case it is advantageous to cover the form with a coat containing a coagulant), or by electrophoresis; or the disperse phase may be separated from the dispersing medium by ultrafiltration. The emulsions may be used alone or in admixture with natural rubber latex or an artificially prepared emulsion of rubber, which may or may not have been previously vulcanized, in any or all of the above treatments, and for any of the purposes mentioned.

In all cases the treatment may be profitably influenced by exposing the materials undergoing treatment to oscillating energy (X-rays, ultra-violet rays, infrared rays etc.) or by including the reaction chamber in an electric circuit.

Filling materials, pigments and the like may be added at any stage of the processes.

My present application is in part a division and in part a continuation of my prior application Ser. No. 359,425. That prior application Ser. No. 359,425 is in part a division and in part a continuation of my earlier application Ser. No. 143,786. Thus in turn my present case is likewise in part a division and in part a continuation of said Ser. No. 143,786.

The present invention is a development of the above mentioned processes and relates to the production of valuable products from natural resins or preparations containing them, e. g., synthetic resins containing natural resins.

Resins are isocolloidal jelly-like systems, the physical properties of which can be influenced by dispersion of a modifying agent in the system. The dispersion must be carried out in the molten state, i. e., the resin gels must first be converted into resin sols. The first of the physical properties which is greatly influenced is the melting point of the gel which is recovered from the melt after cooling. There are reagents which increase the melting point as compared with that of the original starting material free from modifying agents; such reagents have a solidifying action. But there are also reagents which have a liquefying action, giving a product with a lower melting point than that of the original starting material. The solidifying of resinous products may be utilized commercially in the varnish trade in the manufacture of varnishes yielding hard films. The liquefied resins, on the other hand, are also very suitable as varnish raw materials. They behave similarly to thickened drying oils (stand oils or bodied oils), and are able to form flexible and durable varnish films when used for painting purposes without any further addition of unmodified resins or oils. They give solutions of low viscosity, and a varnish with good spreading properties can be obtained by dilution of 70-80 parts of liquefied resin product with 30-20 parts of white spirit or turpentine. These liquefied resins, like stand oils, dry very slowly when used alone as paints, but their drying velocity can be increased to a great extent by the addition of driers and/or unmodified resins.

It has been found that organic compounds containing within the molecule an acidic inorganic residue and an organic residue are often very satisfactory liquefying agents for resins. Amongst these should be mentioned especially aromatic sulphonic acids, and aromatic sulpho chlorides, i. e., derivatives of sulphuric acid and chlorosulphonic acid. These reagents liquefy the resin in certain cases as soon as they are dissolved in it, i. e. a simple fusion yields satisfactory results. The reaction temperature lies between the melting point of the resins and 300° C. An increased duration of heating varies the consistency of the reaction product to a certain extent. The best liquefaction can be obtained by heating under a vacuum of 50-100 mm. of mercury. The reaction can be carried out, however, with a different result under normal atmospheric conditions and under pressures greater than atmospheric. The reaction product can be further varied by a combination of the above described treatment with a gas treatment. Metal-free secondary reagents, such as aldehydes, phenols, amines, alcohols, ketones, hydrocarbons, etc., influence secondarily the reaction. With sulphonic acids and sulphonyl chlorides amongst other agents any of the modifying reagents described may be used as secondary reagents. The following reagents may be mentioned as suitable, amongst many others, for the process here described: p-toluenesulphonyl chloride, p-toluenesulphonic acid, benzenesulphonic acid, benzene-sulphonyl chloride, 2:5-dichloro-benzenesulphonic acid, beta-naphthol-3:6:8-trisulphonic acid, sulphosalicylic acid, p-toluidine-m-sulphonic acid.

Amongst purely inorganic metal free reagents suitable for the modification of resins are sulphuric and sulphurous acid derivatives, such as chlorosulphonic acid, sulphuric acid, sulphuryl chloride, thionyl chloride, etc. To these may be added sulphur chloride, which is useful for many purposes but which produces a rather less marked effect than the reagents just mentioned.

A further feature of the present invention is that very satisfactory results may be obtained by using mixtures of varnish raw materials as starting materials for the modifying process. That is to say, the oil and resin mixture can be made to undergo a modifying action, yielding improved varnish raw materials. It should be mentioned that in reactions in which linseed oil, for instance, froths badly, the addition of a small percentage of resin decreases the froth formation.

The liquefied resin products are very cheap raw materials and yield excellent varnishes which can compete with the finest oil varnishes. The films of the liquefied resins when dried are hard and elastic and their hardness can be further increased by the addition of unmodified resin products (lime resin, ester gum, copals, colophony, synthetic resins etc.), and of hardened modified resins.

The products obtained according to the present invention are suitable starting-materials for the treatment in the form of emulsions as above described.

In the case of treatment under atmospheric conditions it can be generally observed that the liquefaction that occurs in the beginning of the reaction changes into a solidification reaction, yielding products which are harder than those initially formed. This is particularly the case with sulphuric acid under atmospheric conditions; the products finally obtained in this manner with sulphuric acid have not the valuable properties of products made according to my invention. When working with sulphuric acid at ordinary pressure I prefer for this reason to stop the action before re-solidification has set in to any considerable extent. It is usually better, when using sulphuric and sulphurous derivatives, to heat the mixture at, say, 250-300° C., in a vacuum. Best results are obtained with chlorosulphonic acid, but sulphuric acid and the other derivatives previously mentioned are very satisfactory.

Irradiation with short-wave oscillating energy such as ultra-violet rays, X-rays etc., influences favorably the reaction, as does the application of an electric potential in the reaction mass.

The products obtainable according to this invention may be vulcanized by means of sulphur, with or without addition of accelerators, activators, pigments of fillers, or by means of sulphur chloride. When the latter reagent is used as the modifying agent vulcanization may be produced by employing it in suitable amount. In this vulcanization process the products to be vulcanized may be used in the form of solutions, e. g. in the case of the vulcanization of varnishes.

The following examples are given by way of illustration and are in no way limitative. The parts are by weight.

*Example 1*

300 parts of rosin (colophony) and 15 parts p-toluene sulphochloride are heated under vacuum (25-27 inches) without stirring for 4 hours to a temperature of 290-300° C. The resulting product is a thick brown oil, which may be used as varnish raw material e. g. in connection with solidified oils obtained according to one of the above described processes. If instead of rosin estergum (glycerol ester of the rosin acids) is used in the reaction the product is a tough, viscous liquid, useful in high grade varnishes.

*Example 2*

150 parts of rosin, 150 parts of linseed oil and 15 parts of p-toluene sulphochloride are heated in the manner described in respect of Example 1 for 5 hours. The product is a brown viscous oil which shows a green fluorescence.

*Example 3*

300 parts of rosin and 15 parts of beta-naphthol 3:6:8 trisulphonic acid are treated as in Example 2. The product is a stiff, brown solid, useful as varnish raw material. If the experiment is carried out in open beakers instead of in vacuum the resulting product is a hard and brittle rosin.

*Example 4*

If in Example 1 sulpho salicylic acid is used instead of p-toluene sulphochloride, a stiff mass is to be obtained. If p-toluidine-m-sulphonic acid is used a brittle resin is obtained.

*Example 5*

300 parts of rosin and 3 parts of 2:5 dichlor-benzene sulphonic acid yield 30 minutes after the temperature of 280° C. has been reached a viscous oily liquid, useful as varnish raw material. If the experiment is carried out with 15 parts of modifying agent in open vessels a hardened resin results.

*Example 6*

300 parts of resin are treated like in Example 1 with 15 parts of zinc carbonate and 9 parts of p-toluene sulphochloride. After 2 hours and 20 minutes a slightly viscous fairly pale clear liquid is obtained. If the treatment is carried out first with zinc carbonate alone and then with p-toluene sulphochloride or first with p-toluene sulphochloride alone and then with zinc carbonate the results are somewhat different.

*Example 7*

If in Example 1 sulphur chloride is used as modifying agent a stiff brown solid results. Chlorsulphonic acid yields a thick golden brown oil, sulphonic acid a fairly thick brownish oil, thionyl chloride a golden yellow-semi-solid mass and sulphuryl chloride a very thick golden brown oil.

What I claim is:—

1. In the manufacture of modified products from natural resins, said modified products having physical properties such as a melting point and the like, substantially different from the original resins, the process which comprises mixing the said resin with a minor amount of a metal-free polar compound, said polar compound being a sulphur-containing compound having the following formula $$Y—SO_n—X$$

wherein Y represents an organic nucleus, hydrogen or chlorine, X represents hydrogen or chlorine and $n$ represents 1, 2, 3 or 4, heating the mixture to temperatures of at least 200° C., under vacuum, until a modified product having substantially different physical properties is obtained.

2. In the manufacture of thick, oily liquids, from rosins, said liquids being useful as a liquid vehicle in coating compositions, the process which comprises mixing a rosin with a minor amount of an organic sulphuroxy compound having the following formula $$R—SO_n—X$$

wherein R represents an aryl nucleus, X represents hydrogen or chlorine and $n$ represents 2 or 3, heating the mixture to temperatures between 250° and 300° C. until an oily liquid is obtained and recovering said oily liquid.

3. The process of claim 2 wherein said organic sulphuroxy compound is a sulpho-chloride of the benzene series.

4. The process of claim 2 wherein said heating is effected under a vacuum equivalent to 50–100 mm. of mercury.

5. In the manufacture of liquid products from rosins, the process which comprises mixing a rosin with a small amount of an aryl sulphonyl chloride, heating the mixture to between 250° and 300° C. under vacuum, until a liquid product is obtained and recovering said liquid product.

6. The process of claim 5 wherein said aryl sulphonyl chloride is p-toluene sulphonyl chloride.

7. In the manufacture of liquid products from rosins, the process which comprises mixing 100 parts of rosin with from 3 to 10 parts of p-toluene sulphonyl chloride, heating the mixture to between 290° and 300° C. under a vacuum equivalent to 25 to 27 inches of mercury, until an oily liquid is obtained and recovering the liquid product then obtained.

8. The process of claim 7 wherein 100 parts of linseed oil is added to the mixture prior to said heating.

9. The process of claim 7 wherein about 5 parts of zinc carbonate are added to said mixture prior to said heating.

10. The process of claim 7 wherein about 5 parts of said p-toluene-sulphonyl chloride are used.

11. The process of claim 1, wherein said polar compound is an aryl sulphonic acid.

12. The process of claim 2, wherein said organic sulphuroxy compound is a sulphonic acid of the benzene series.

13. The process of claim 2, wherein is a chloro-benzene sulphonic acid.

14. In the manufacture of viscous, oily liquid useful as a varnish raw material, from resins by the process of claim 2, the process which comprises mixing about 3 parts of 2:5-dichlor-benzene sulphonic acid with 300 parts of rosin and then heating the mixture at about 280° C. until a viscous oily liquid is obtained.

LÀSZLÓ AUER.